(12) United States Patent
Dietrich et al.

(10) Patent No.: US 9,027,316 B2
(45) Date of Patent: May 12, 2015

(54) CUTTING HEADER WITH FINGER MOUNTED RAISED DIVIDER PANS

(71) Applicant: Dave Dietrich, Assiniboia (CA)

(72) Inventors: Dave Dietrich, Assiniboia (CA); Dan Samiosette, Assiniboia (CA)

( * ) Notice: Subject to any disclaimer, the term of this patent is extended or adjusted under 35 U.S.C. 154(b) by 176 days.

(21) Appl. No.: 13/779,272

(22) Filed: Feb. 27, 2013

(65) Prior Publication Data

US 2014/0237974 A1     Aug. 28, 2014

(51) Int. Cl.
| | | |
|---|---|---|
| *A01D 41/08* | (2006.01) | |
| *A01D 41/00* | (2006.01) | |
| *A01D 45/02* | (2006.01) | |
| *A01D 45/30* | (2006.01) | |
| *A01D 34/18* | (2006.01) | |

(52) U.S. Cl.
CPC .............. *A01D 45/021* (2013.01); *A01D 45/30* (2013.01); *A01D 34/18* (2013.01)

(58) Field of Classification Search
USPC ....................... 56/126, 119, 312, 314, 207, 53
See application file for complete search history.

(56) References Cited

U.S. PATENT DOCUMENTS

| | | | |
|---|---|---|---|
| 700,029 A | | 5/1902 | Gatermann |
| 791,022 A | | 5/1905 | Gaterman |
| 1,258,740 A | * | 3/1918 | Blocki .............................. 56/313 |
| 1,368,014 A | * | 2/1921 | Bauert et al. .................... 56/127 |
| 2,575,120 A | | 11/1951 | Peel |
| 2,576,122 A | * | 11/1951 | Kenison ........................... 56/312 |
| 2,577,324 A | * | 12/1951 | Goesch ............................ 56/312 |
| 2,765,612 A | * | 10/1956 | Raumaker et al. ................. 56/97 |
| 2,867,961 A | * | 1/1959 | Heilbrun ......................... 56/119 |
| 3,812,661 A | * | 5/1974 | Baker ............................. 56/14.4 |
| 3,844,094 A | * | 10/1974 | Janzen ............................ 56/126 |
| 3,995,413 A | * | 12/1976 | Lynch ............................. 56/119 |
| 4,120,138 A | | 10/1978 | Schumacher, II et al. |
| 4,255,920 A | * | 3/1981 | Janzen ............................ 56/126 |
| 4,445,314 A | * | 5/1984 | Gust ............................... 56/126 |
| 4,589,250 A | * | 5/1986 | Faul, Jr. .......................... 56/126 |
| 5,105,610 A | | 4/1992 | Britten |
| 5,809,759 A | * | 9/1998 | Zyla et al. ....................... 56/298 |
| 5,943,849 A | * | 8/1999 | Billheimer ..................... 56/119 |
| 6,032,445 A | | 3/2000 | Heintzman |
| 6,564,536 B1 | * | 5/2003 | Hoffer ............................ 56/119 |
| 8,196,381 B2 | * | 6/2012 | Herman et al. .................. 56/312 |
| 8,572,942 B2 | * | 11/2013 | Dietrich .......................... 56/126 |
| 2011/0138764 A1 | * | 6/2011 | Herman et al. .................. 56/207 |
| 2012/0186215 A1 | * | 7/2012 | Dietrich .......................... 56/126 |

* cited by examiner

*Primary Examiner* — Árpád Fábián-Kovács
(74) *Attorney, Agent, or Firm* — Nixon & Vanderhye P.C.

(57) ABSTRACT

A corn harvesting header comprises a knife bar extending along a front lower edge of a cutting header, with triangular knife sections attached along the bar and a plurality of guards with guard fingers extending forward. Pointed divider pans extend forward from the header such that a slot is formed between adjacent pans. A mounting bracket extends down from a rear of each pan and is attached to forward end portions of a pair of adjacent guard fingers, leaving rear portions of these guard fingers exposed. The divider pans are attached to alternating pairs of guard fingers such that a pair of bare guard fingers extends forward under and laterally adjacent to edges of each slot. The bottom surface of each seed pan is above the guard fingers an elevated distance that is greater than a spacing distance between the guard fingers. The header cuts the corn rows at angle.

21 Claims, 2 Drawing Sheets

CUTTING HEADER WITH FINGER MOUNTED RAISED DIVIDER PANS

This invention is in the field of agricultural harvesting equipment and in particular a method and apparatus for cutting corn with a conventional grain cutting header on an agricultural combine harvester.

BACKGROUND

Corn is commonly grown as a row crop with the plants seeded and growing in rows that are typically 15 to 40 inches apart. When harvesting corn as grain, the corn plants are left in the field until they are fully mature and the kernels are dry. During growth the corn cobs typically upward and lean outward from the stalk however when fully mature the connection between the cob and the stalk dries out and the cobs fall to a downward orientation hanging down from the stalk. The dry stalks are also often leaning quite significantly from their vertical growth orientation.

Corn is typically harvested by mounting a corn header on a conventional combine. Slots on the corn header are configured to correspond to the spacing of the rows of corn. As the header moves down the rows, the cobs are stripped off the stalks and directed into the combine mechanism where the kernels are removed from the cobs and the cobs are directed back onto the field surface from the rear end of the combine. The cost of such a corn header is typically $50,000-$75,000 or more.

For crops other than corn, such as wheat, canola, and the like a conventional cutting header is used. Such conventional cutting headers have a knife extending across the entire width of the header. The knife comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

The conventional knife operates in a vertical range from its lowest position a few inches above the ground to a maximum position that can be several feet above the ground. To pick up short crop plants and plants that are lying on the ground crop lifters are attached to the header and provide an arm of various designs that rides along the ground ahead of the knife, and a lifting finger extending at a shallow angle from the front of the arm up and back over the knife. U.S. Pat. Nos. 700,029 and 791,022 to Gatermann disclose such a crop lifter that is pivotally attached to the header so as to be able to move up and down to follow the ground. U.S. Pat. No. 4,120,138 to Schumacher illustrates a crop lifter that is fixed to the header instead of pivoting, but is made of spring steel so that same may move up and down to follow the ground.

In conventional headers loss also occurs in straight cut harvesting of crops such as dry beans, peas, milo, canola, and sunflowers due to heads or pods shattering or falling below the cutter bar. Dry, fragile seed pods often shatter when contacted by the harvesting equipment before they are on the header, and the shattered pods spill their seeds to fall on the ground. Seeds fall from the shattered pods down through the knife to the ground. While this problem of shattering seed pods and heads is more severe in some crops than others, there is generally at least some shattering loss in any crop.

Seed pans have been developed that attach to the front edge of the header and extend forward of the knife. The pans are spaced to form slots between the pans. The crop plants pass along the slots and are cut by the knife at the rear end of the slots. Seeds falling from the plants are caught in the pans and work their way rearward and onto the knife. Such seed pans are disclosed for example in U.S. Pat. No. 2,575,120 to Peel and U.S. Pat. No. 6,032,445 to Heintzman. The top surfaces of the pans are flat, with raised side walls to keep the seeds on the pan. The pans are configured to slope downward from front to rear so that the seeds move down the sloping surface onto the header and into the harvester. These seed pans are configured so that the slots between the pans are spaced to match the row spacing of the crops being harvested, such as soybeans, sunflowers, and the like that are typically planted in relatively widely spaced rows. Thus a large part of the knife is covered and not used.

U.S. Pat. No. 5,105,610 to Britten discloses crop stalk guides for attachment to a harvest header to provide crop dividers for separating the stalks in adjacent rows from one another. The Britten guides do not appear to catch falling seeds, as the guides comprise plates with flat top surfaces which have no walls to prevent seeds from falling off, but rather are simply used to guide the crop stalks into the knife. A plate is mounted to tops of two adjacent guard fingers and then bends slightly upward so it extends substantially horizontally forward at the same vertical level as the fingers when the fingers are in their working orientation sloping somewhat downward. The plates are mounted to the guards such that all guard fingers are covered by a plate, and the ends of the slots lie between adjacent guard fingers. The plates guide the stalks to each side and along a slot between the plates to the knife. The slots are much narrower than the spacing between the guard fingers, so at the rear ends of the slots where the knife is located, the plates must be notched so that the outer edges of the guard fingers are exposed to the knife sections to allow the knife sections to shear the stalks against the guard fingers.

Using conventional cutting headers to harvest corn is problematic. The corn plants are typically quite tall, and when dried out as they are at harvest time, the stalks often lean forward and sideways to the combine's operating travel direction such that the stalks themselves, or at least some of the cobs thereon, are not cut and carried onto the header but fall to the ground, and are wasted. Thus farmers who would like to grow corn as part of a crop rotation with other crops are faced with the large expense of buying a corn header for their combines, and so often simply leave corn out of the crop rotation.

SUMMARY OF THE INVENTION

It is an object of the present invention to provide a cutting header apparatus and a method for harvesting corn that overcome problems in the prior art.

In a first embodiment the present invention provides a corn harvesting header apparatus for an agricultural combine harvester. The apparatus comprises a knife assembly comprising a knife bar extending along a front lower edge of a cutting header, with triangular knife sections attached along the bar such that the apex of the triangle extends forward from the bar, and a plurality of guards attached to the front lower edge of the header, the guards comprising pointed guard fingers extending forward and substantially equally spaced along the front lower edge of the cutting header. A plurality of divider pans extend forward from the front lower edge of the header, each divider pan having substantially parallel side edges such that a slot is formed between side edges of adjacent divider pans, and front portions of the side edges converge to form a point at a front end of each divider pan. Each divider pan comprises a mounting bracket extending down from a rear portion of a bottom surface of the divider pan and attached to forward end portions of a pair of adjacent guard fingers, leaving rear portions of these guard fingers exposed. The divider pans are attached along the front lower edge of the cutting header to alternating pairs of guard fingers such that a pair of bare guard fingers extends forward under and laterally adjacent to edges of each slot. The bottom surface of each seed pan is above the guard fingers an elevated distance that is greater than a spacing distance between the guard fingers.

In a second embodiment the present invention provides a method of harvesting corn, wherein the corn is planted in parallel rows. The method comprises mounting a corn harvesting header apparatus on an agricultural combine harvester. The header apparatus comprises a knife bar extending along a front lower edge of a cutting header, with triangular knife sections attached along the bar such that the apex of the triangle extends forward from the bar, and a plurality of guards attached to the front lower edge of the header, the guards comprising pointed guard fingers extending forward and substantially equally spaced along the front lower edge of the cutting header; a plurality of divider pans extending forward from the header, each divider pan having substantially parallel side edges such that a slot is formed between side edges of adjacent divider pans, and wherein front portions of the side edges converge to form a point at a front end of each divider pan; wherein each divider pan comprises a mounting bracket extending down from a rear portion of a bottom surface of the divider pan and attached to forward end portions of a pair of adjacent guard fingers, leaving rear portions of these guard fingers exposed; wherein the divider pans are attached along the front lower edge of the cutting header to alternating pairs of guard fingers such that a pair of bare guard fingers extends forward under and laterally adjacent to edges of each slot; and wherein a bottom of each seed pan is above the guard fingers an elevated distance that is greater than a spacing distance between the guard fingers. The agricultural combine harvester is moved such that the corn harvesting header apparatus moves through the corn at an angle to the rows that is about 15 degrees to about 75 degrees.

The present invention allows a conventional cutting header to be readily converted to cut corn at a cost much less than a conventional corn header. Conventional cutting headers are also available in widths up to about 45 feet, while corn headers typically have a maximum width of 35 feet, allowing harvest of more acres per hour. The method of the invention can be used to remove the great majority of corn stalks from the field to leave the field surface in a desirable condition for subsequent field operations, and also provides windrows of corn residue that can be grazed by livestock or baled to be fed to animals, burned for heat, or otherwise utilized.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
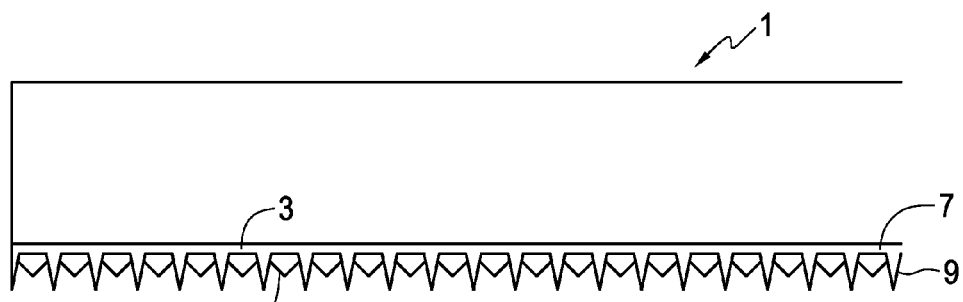
FIG. 1 is a schematic top view of a conventional cutting header of the prior art.

FIG. 1 schematically illustrates a conventional cutting header 1 of the prior art for attachment to an agricultural combine harvester. The header 1 comprises a knife assembly with a knife bar 3 extending along a front lower edge of a cutting header 1. The knife bar 3 has triangular knife sections 5 attached along the bar 3 such that the apex of the triangle extends forward from the bar 3, and a plurality of guards 7 are attached to the front lower edge of the header 1. The guards 7 comprise pointed guard fingers 9 extending forward and substantially equally spaced along the front lower edge of the cutting header 1, and the knife sections 5 move laterally in slots in the guard fingers 9. In operation the knife sections 5 move rapidly back and forth and shear off crop stalks against the sides of the guard fingers 9.

Figure 2:
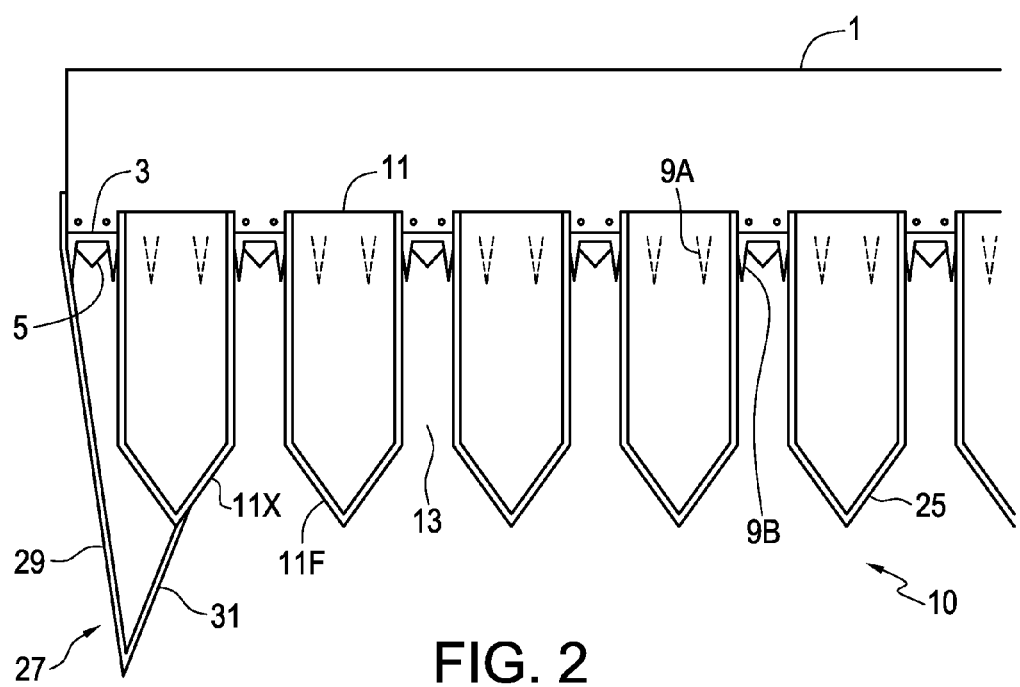
FIG. 2 is a schematic top view of an embodiment of a corn harvesting header apparatus of the present invention.
Figure 3:
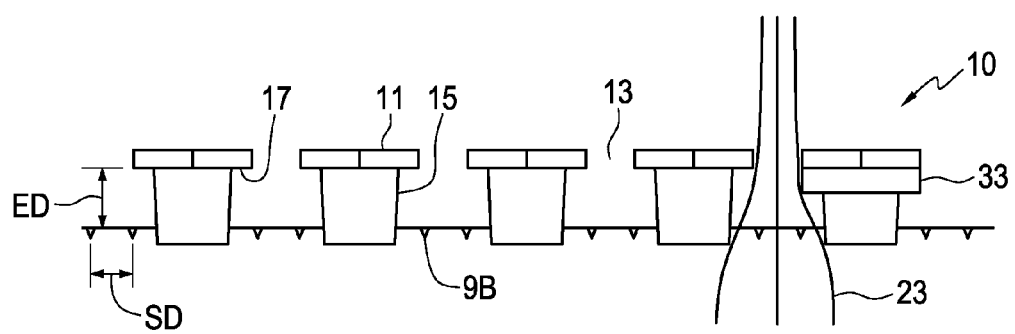
FIG. 3 is a schematic front view of the embodiment of FIG. 2.

FIGS. 2 and 3 schematically illustrate an embodiment of a corn harvesting header apparatus 10 of the present invention where a plurality of divider pans 11 extend forward from the front lower edge of the header 1 of the prior art. Each divider pan 11 has substantially parallel side edges such that a slot 13 is formed between side edges of adjacent divider pans 11. Front portions 11F of the side edges converge to form a point at a front end of each divider pan 11. The width of the slots 13 is substantially equal to the spacing distance SD between the guard fingers 9.

Figure 4:
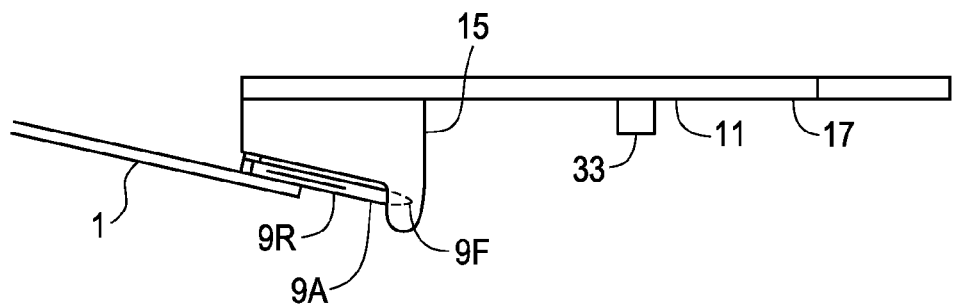
FIG. 4 is a schematic side view showing the mounting of the divider pans to the cutting header guard fingers.

Each divider pan 11 has a mounting bracket 15 extending down from a rear portion of a bottom surface 17 of the divider pan 11 and attached to forward end portions 9F of a pair of adjacent guard fingers 9, leaving rear portions 9R of these guard fingers 9 exposed, as schematically illustrated in FIG. 4. The divider pans 11 are attached along the front lower edge of the cutting header to alternating pairs of guard fingers 9A such that a pair of bare guard fingers 9B extends forward under and laterally adjacent to edges of each slot 13 and the bottom surface 17 of each seed pan 11 is above the guard fingers 9 an elevated distance ED that is greater than the spacing distance SD between the guard fingers. The rear of the mounting bracket 15 is attached to one of the bolts attaching the guards 7 to the header, conveniently by a quick-attach mechanism as is known in the art.

Figure 6:
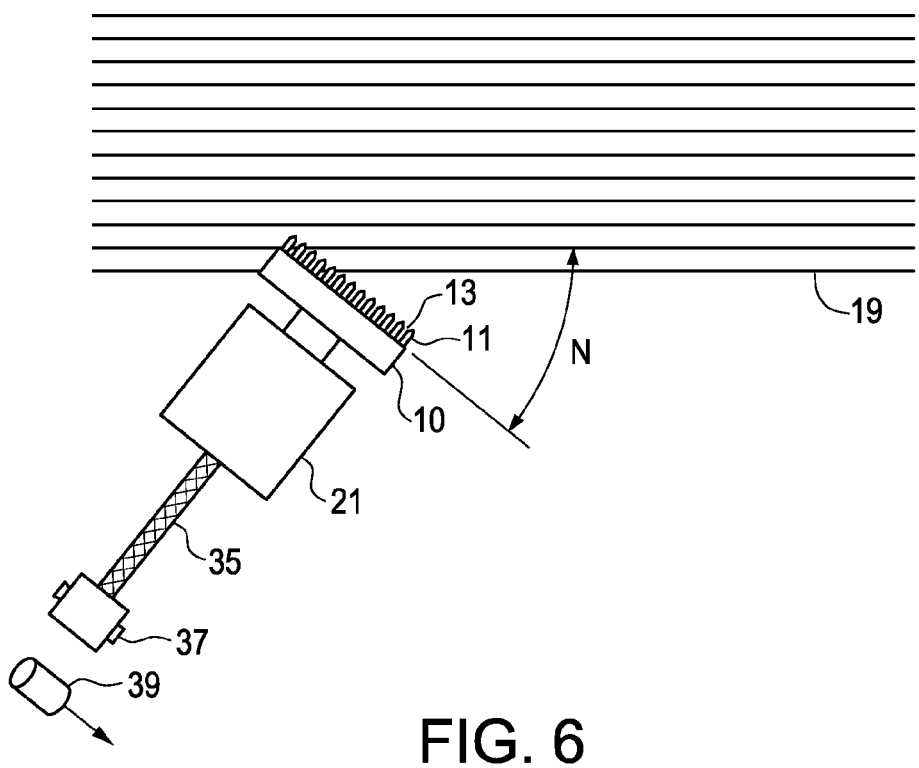
FIG. 6 is a schematic top view of the embodiment of FIG. 2 harvesting a field of corn at an angle to the corn rows.

Corn is typically planted in parallel rows 19 spaced about 15-40 inches apart and when the corn harvesting header apparatus 10 is mounted on an agricultural combine harvester 21, as schematically illustrated in FIG. 6, the combine harvester 21 is oriented such that the apparatus 10 moves through the corn at an angle N to the rows 19 that is about 45 degrees. It is contemplated that at an angle N of about 15 degrees to about 75 degrees will provide satisfactory results if such an angle better suits the area being harvested.

As the apparatus 10 moves through the corn rows 19, the corn stalks 23 are guided into the slots 13 between the divider pans 11 as schematically illustrated in FIG. 3. Since the slots 13 are raised above the knife bar 3 and rear portions 9R of the guard fingers 9A to which the mounting brackets 15 are attached are left exposed, the knife sections 5 can shear stalks not only against both side edges of the bare guard fingers 9B, but also against the exposed side edges of the rear portions of the guard fingers 9A to which the mounting brackets 15 are attached. Thus only inside edges of the attaching guard fingers 9A are not available for cutting, such that out of eight guard side edges, only two are not available for cutting.

The apparatus 10 with the elevated divider pans 11 guides leaning corn stalks to the knife bar with significantly less losses compared to cutting corn with the conventional cutting header 1. A typical spacing distance is about three inches and an elevated distance ED that is about 1.5 times the spacing distance SD, or about 4.5 inches has been found to provide satisfactory results, but the operation is not particularly sensitive to changes in the elevated distance ED, so long as same is sufficient to allow the stalks 23 to take the configuration shown in FIG. 3 and be sheared against the exposed edges of the attaching guard fingers 9A.

In the illustrated apparatus 10, walls 25 extend upward from the side edges of the divider pans 11 to keep cobs and the like from falling off onto the ground. Also as illustrated in FIG. 4 when the cutting header 1 is in an operating position it typically slopes down somewhat, and the mounting brackets 15 are typically configured to orient the divider pans sloping somewhat upward and forward from the front lower edge of the cutting header 1 so that cobs slide off the open rear end of the divider pans 11 onto the header 1 and into the harvest mechanism. It is contemplated that typically the divider pans 11 will slope upward at an angle less than 20 degrees above horizontal, and more typically at an angle between about 10 degrees and about 15 degrees above horizontal.

The illustrated apparatus 10 includes an edge guide 27 for gathering corn stalks at the end of the cutting header 1 to reduce fouling and buildup of stalks at the end of the cutting header 1. The edge guide 27 comprises a first guide plate 29 extending from an end edge of the cutting header 1 forward and inward to a location forward of the front end of an outer divider pan 11X, and a second guide plate 31 extending rearward and inward from a forward end of the first guide plate 29 to the point at the front end of the outer divider pan 11X.

Figure 5:
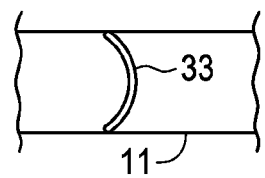
FIG. 5 is a bottom view of a deflector plate extending down from a divider pan.

A deflector plate 33 is also shown on the illustrated apparatus 10 in FIGS. 3-5. The deflector plate 33 extends down from the bottom surface 17 of the divider pan 11 forward of the mounting bracket 15. The deflector plate curves forward from one side edge of the divider pan to a center of the divider pan and then rearward to the opposite side edge such that corn stalks contacting the deflector plate 33 are directed toward the side edges.

As schematically illustrated in FIG. 6, the invention further provides a method of harvesting corn planted in parallel rows 19. The method comprises mounting the corn harvesting header apparatus 10 on an agricultural combine harvester 21 and moving the agricultural combine harvester 21 such that the corn harvesting header apparatus 1 moves through the corn at an angle to the rows that is about 15 degrees to about 75 degrees.

The corn harvesting header apparatus 10 and the method of the present invention allow a conventional cutting header to be converted by the addition of the divider pans 11 to harvest corn efficiently with reduced losses due to uncut stalks and cobs falling to the ground. The apparatus 10 cuts the stalks and feeds the entire stalk into the harvesting mechanism of the combine harvester 21 instead of leaving the majority of stalks on the ground spread out across the width of the corn header. The stalks are quite mangled and broken up by the harvesting mechanism and present less problems for subsequent field operations than the whole stalks spread across the field.

To prepare the field for subsequent operations the corn stalks can be removed from the field altogether by directing harvested corn stalks into a windrow 35 behind the combine harvester and using a baler 37 to bale the windrow of harvested corn stalks and then removing the bales 39 of harvested corn stalks from the field. In addition to leaving the field surface in a desirable condition, the bales 39 can be utilized by feeding same to animals, burning them for heat, or like purposes.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A corn harvesting header apparatus for an agricultural combine harvester, the apparatus comprising:
   a knife assembly comprising a knife bar extending along a front lower edge of a cutting header, with triangular knife sections attached along the bar such that the apex of the triangle extends forward from the bar, and a plurality of guards attached to the front lower edge of the header, the guards comprising pointed guard fingers extending forward and substantially equally spaced along the front lower edge of the cutting header;
   a plurality of divider pans extending forward from the front lower edge of the header, each divider pan having substantially parallel side edges such that a slot is formed between side edges of adjacent divider pans, and wherein front portions of the side edges converge to form a point at a front end of each divider pan;
   wherein each divider pan comprises a mounting bracket extending down from a rear portion of a bottom surface of the divider pan and attached to forward end portions of a pair of adjacent guard fingers, leaving rear portions of these guard fingers exposed;
   wherein the divider pans are attached along the front lower edge of the cutting header to alternating pairs of guard fingers such that a pair of bare guard fingers extends forward under and laterally adjacent to edges of each slot; and
   wherein the bottom surface of each divider pan is above the guard fingers an elevated distance that is greater than a spacing distance between the guard fingers.

2. The apparatus of claim 1 wherein the elevated distance is about 1.5 times the spacing distance.

3. The apparatus of claim 1 wherein the spacing distance is about three inches.

4. The apparatus of claim 1 wherein when the cutting header is in an operating position, the divider pans slope upward and forward from the front lower edge of the cutting header.

5. The apparatus of claim 4 wherein the divider pans slope upward at an angle less than 20 degrees above horizontal.

6. The apparatus of claim 5 wherein the divider pans slope upward at an angle between about 10 degrees and about 15 degrees above horizontal.

7. The apparatus of claim 1 comprising walls extending upward from the side edges of the divider pans.

8. The apparatus of claim 1 wherein a width of the slots is substantially equal to the spacing distance.

9. The apparatus of claim 1 comprising an edge guide comprising a first guide plate extending from an end edge of the cutting header forward and inward to a location forward of the front end of an outer divider pan, and a second guide plate extending rearward and inward from a forward end of the first guide plate to the point at the front end of the outer divider pan.

10. The apparatus of claim 1 comprising a curved deflector plate extending down from the bottom surface of at least one divider pan forward of the mounting bracket, the deflector plate curving forward from one side edge of the at least one divider pan to a center of the at least one divider pan and then rearward to an opposite side such that corn stalks contacting the deflector plate are directed toward the side edges.

11. A method of harvesting corn, wherein the corn is planted in parallel rows, the method comprising:
   mounting a corn harvesting header apparatus on an agricultural combine harvester, the header apparatus comprising:
      a knife bar extending along a front lower edge of a cutting header, with triangular knife sections attached along the bar such that the apex of the triangle extends forward from the bar, and a plurality of guards attached to the front lower edge of the header, the guards comprising pointed guard fingers extending forward and substantially equally spaced along the front lower edge of the cutting header;
      a plurality of divider pans extending forward from the header, each divider pan having substantially parallel side edges such that a slot is formed between side edges of adjacent divider pans, and wherein front portions of the side edges converge to form a point at a front end of each divider pan;
      wherein each divider pan comprises a mounting bracket extending down from a rear portion of a bottom surface of the divider pan and attached to forward end portions of a pair of adjacent guard fingers, leaving rear portions of these guard fingers exposed;
      wherein the divider pans are attached along the front lower edge of the cutting header to alternating pairs of guard fingers such that a pair of bare guard fingers extends forward under and laterally adjacent to edges of each slot; and
      wherein a bottom of each divider pan is above the guard fingers an elevated distance that is greater than a spacing distance between the guard fingers;
   moving the agricultural combine harvester such that the corn harvesting header apparatus moves through the corn at an angle to the rows that is about 15 degrees to about 75 degrees.

12. The method of claim 11 wherein the elevated distance is about 1.5 times the spacing distance.

13. The method of claim 11 wherein the spacing distance is about three inches.

14. The method of claim 11 wherein when the cutting header is in an operating position, the divider pans slope upward and forward from the front lower edge of the cutting header.

15. The method of claim 14 wherein the divider pans slope upward at an angle less than 20 degrees above horizontal.

16. The method of claim 15 wherein the divider pans slope upward at an angle between about 10 degrees and about 15 degrees above horizontal.

17. The method of claim 11 comprising providing walls extending upward from the side edges of the divider pans.

18. The method of claim 11 wherein a width of the slots is substantially equal to the spacing distance.

19. The method of claim 11 comprising providing an edge guide comprising a first guide plate extending from an end edge of the cutting header forward and inward to a location forward of the front end of an outer divider pan, and a second guide plate extending rearward and inward from a forward end of the first guide plate to the point at the front end of the outer divider pan.

20. The method of claim 11 comprising providing a deflector plate extending down from the bottom surface of at least one divider pan forward of the mounting bracket and adjacent to one of the side edges of the at least one divider pan such that corn stalks contacting the deflector plate are directed toward the at least one of the side edges.

21. The method of claim 11 comprising directing harvested corn stalks into a windrow behind the combine harvester and baling the harvested corn stalks and removing the baled harvested corn stalks.

* * * * *